(12) United States Patent
Maring (10) Patent No.: US 7,315,003 B2
(45) Date of Patent: Jan. 1, 2008

(54) HIGH RESOLUTION OFFSET ELECTRONIC WEIGHING DEVICES AND METHODS

(75) Inventor: Frank C. Maring, Lafayette, CO (US)

(73) Assignee: Scientech Incorporated, Boulder, CO (US)

( * ) Notice: Subject to any disclaimer, the term of this patent is extended or adjusted under 35 U.S.C. 154(b) by 142 days.

(21) Appl. No.: 10/938,706

(22) Filed: Sep. 13, 2004

(65) Prior Publication Data
US 2006/0054365 A1    Mar. 16, 2006

(51) Int. Cl.
*G01G 7/04* (2006.01)
*G01G 1/00* (2006.01)

(52) U.S. Cl. .............................. 177/203; 177/210 EM; 177/212; 177/230

(58) Field of Classification Search ........ 177/203–206, 177/210 EM, 212, 225, 230
See application file for complete search history.

(56) References Cited

U.S. PATENT DOCUMENTS

| | | | | |
|---|---|---|---|---|
| 3,055,444 A | * | 9/1962 | Chyo | 177/191 |
| 3,680,650 A | | 8/1972 | Zimmerer | 177/210 R |
| 3,734,218 A | * | 5/1973 | Kupper | 177/203 |
| 3,955,638 A | | 5/1976 | Wasko | 177/212 |
| 3,973,636 A | * | 8/1976 | Uchida | 177/132 |
| 4,034,819 A | | 7/1977 | Akers et al. | 177/210 C |
| 4,109,738 A | | 8/1978 | Kunz | 177/212 |
| 4,153,124 A | * | 5/1979 | Knothe et al. | 177/210 EM |
| 4,354,563 A | * | 10/1982 | Luchinger et al. | 177/212 |
| 4,373,596 A | * | 2/1983 | Kunz | 177/212 |
| 4,582,152 A | | 4/1986 | Gibbons | 177/210 C |
| 4,964,478 A | | 10/1990 | Stadler et al. | 177/229 |
| 5,340,951 A | | 8/1994 | Hungerbuhler et al. | 177/229 |
| 6,284,987 B1 | * | 9/2001 | Al-Modiny | 177/170 |

* cited by examiner

*Primary Examiner*—Randy W Gibson
(74) *Attorney, Agent, or Firm*—Harold A. Burdick (57) ABSTRACT

Electronic weighing devices and method are disclosed wherein balances (particularly of the direct load type) are adapted to utilize less power thus creating less system heat and thereby enhancing weighing accuracy and range of operation. A preferred embodiment of the device includes a frame having an articulating load support structure connected thereto. The support structure carries a coil and movable capacitor plate while the frame locates a permanent magnet and fixed capacitor plate. An elastic offset, such as a spring, is adjustably located between the support structure and the frame to offset, or counterbalance, the support structure, preferably up to about one-half of the balance's rated capacity in any particular embodiment. A push-pull servo system initially causes current in the coil to flow in a direction producing a resultant force which is additive to the pan load. Only when the counterbalancing force is exceeded by the pan load does the coil current produce a force opposing the pan load.

19 Claims, 7 Drawing Sheets

HIGH RESOLUTION OFFSET ELECTRONIC WEIGHING DEVICES AND METHODS

FIELD OF THE INVENTION

This invention relates to scales and balances, and, more particularly, relates to electronic balances accommodating direct loading and utilizing electro-magnetic load balancing.

BACKGROUND OF THE INVENTION

Weighing devices are generally designated as scales or balances. Scales are devices which measure displacement in response to a load being weighed, while balances are devices wherein a quantifiable (i.e., known) opposing force is utilized to counter, or balance, a load without occurrence of substantial mechanical displacement.

Scales are usually low-resolution devices which employ a spring of some nature which distends in accord with Hooke's law. By measuring the calibrated spring displacement, the weight of the applied load may be determined. One example of an advanced scale utilizes a parallelogram suspension which resolves the normal force to be measured from force couples, such as off-center loading torques, that are not of interest. Such suspension is also known as Roberval's mechanism (see U.S. Pat. No. 4,582,152, which though characterized as a balance is actually a scale).

Heretofore known balances include mechanical equal-length beams with a center fulcrum which compares the mass of an unknown load on one side of the fulcrum to a known mass on the other. When the two masses are balanced across the fulcrum, the unknown mass is equal to the known mass. While capable of excellent resolution, mechanical balances require tedious fine adjustments.

Electronic balances often utilize a variable electromagnetic opposing force to counter the unknown load. A position sensor, capacitance or optical typically, measures incipient displacement from a null position and varies the electro-magnetic force to balance the unknown load while maintaining the null position. Thus, the electrical current, calibrated relative to known masses, may be measured and, as a function of the balance load mass, provides an output indicative of the mass of the load (see, for example, U.S. Pat. Nos. 3,680,650 and 4,034,819).

One type of basic electronic balance, known as a "direct load" balance or a "direct loader" (as shown in U.S. Pat. No. 3,680,650), utilizes an armature or post suspended for vertical movement and which carries a pan and the moveable plate of a capacitor null sensor. A fixed plate or plates complete the capacitor such that displacement of the moveable plate in response to a load on the pan modulates an electronic circuit to produce current flow through a coil also carried on the armature. The coil is disposed within a permanent magnet to form a speaker coil structure. The field generated by the coil current in conjunction with the field of the permanent magnet produces a force applied to balance a load on the pan. Accordingly, the current produced to balance a given load is an accurate function of the applied load. This type of balance, while simple and relatively accurate, tends to be somewhat capacity limited, primarily due to heat developed by the current flowing through the coil and the electrical resistance of the coil. Such heat increases as the square of the current. Eddy currents in the magnet also contribute to heat. The magnet, which looses field strength as its temperature increases, must of course be adjacent the coil and is readily heated by the coil. Also, such heat can be conducted to the mechanical structure of the balance where component expansion contributes to weighing errors.

Higher load capacity electronic balances are known and or utilized (see U.S. Pat. No. 4,109,738), wherein the coil assembly is connected to the pan carrying armature structure by a lever structure which provides for mechanical amplification of the force generated by the coil and magnet arrangement. The current required to support a given applied load is thus diminished. Such balances, however, involve substantial mechanical complications, require additional fragile suspension and introduce further sources of error in lever structures over "direct loader" type balances.

Another approach heretofore known and/or utilized for addressing the deleterious effects of heat resulting from current passing through the coil of electronic lever balances utilizes mechanical counterbalancing (or offset) of the lever by mass on the coil side of the lever to about one-half of the balance's rated capacity (see U.S. Pat. No. 3,955,638, utilizing an optical null sensor). Thus the null sensor initially causes coil current to flow in a direction to produce a resultant force which is additive to the pan load. Only when the counter balance mass is exceeded by the pan load does the coil current produce a force opposing the pan load. In such case the heat generated by the coil current is one quarter of that produced by a balance that fully counterbalances the pan load with current flowing in a single direction. Such balances, while effectively reducing heat in the system, introduce sources of weighing error inherent in lever and mass structures and could still be further improved to allow for wider capacity range and more compact design.

SUMMARY OF THE INVENTION

This invention provides offset electronic weighing devices and methods capable of high resolution performance and enhanced capacity range. These devices and methods particularly pertain to balances of the direct loader type. The devices of this invention are characterized by low power consumption and resultant lowered system heat generation, mid-point offset adjustment without need for levers or counterweights, low inertia, accommodation of various balance models and capacities utilizing elements common to all, and compact design.

The offset electronic weighing device of this invention includes a frame having a load displaceable support system connected therewith. An electro-magnetic load compensation system compensates for displacement of the support system relative to the frame and responsive thereto provides an output indicative thereof. An elastic offset is connected between the frame and the support system to establish a selected load offset at the support system.

The frame has a permanent magnet and a fixed portion of a null sensor (a capacitor plate, for example) attached thereto. The support system includes upper and lower support members connected with the frame and an armature structure connected with the upper and lower support members. The armature structure includes a pan mount, a movable portion of the null sensor, and a coil located adjacent to the permanent magnet. A servo system is connected with the null sensor and the coil for providing current to the coil responsive to signals from the null sensor. The elastic offset is preferably at least a first tension adjustable spring connected between the armature structure and the frame to provide selective counterbalancing of load at the armature structure thus, in a preferred embodiment, causing current from a push-pull servo system to flow in a direction in the coil producing a resultant force which is additive to the load at the armature structure until the offset is overcome by load applied at the armature structure.

The spring is a simple spring (a dual spring assembly is preferred) utilized to counterbalance the movable mechanism of the balance supporting the load receiving pan, the spring preferably positioned to act substantially coaxially with the load bearing armature. The counterbalance spring is adjustable and tensioned to offset the weight of the movable structure plus about one-half of the rated capacity of the balance (in any particular utilization). Used with a bi-directional null sensor arrangement, a balance having enhanced accuracy and low heat generation is provided, such result being unexpected considering the low resolution of systems heretofore known utilizing springs to measure weight (i.e., scales).

The methods of this invention include methods for adapting a direct load electronic balance to provide counterbalancing of up to about one-half of the balance's rated capacity to thereby reduce balance system heating, as well as methods for enhancing weight measurement accuracy by a direct load electronic balance system. The method for adapting a direct load electronic balance includes the steps of connecting at least one elastic member between the frame and the support system of the balance, and adjusting tension of the elastic member to provide selected counterbalancing.

The methods for enhancing weight measurement accuracy by a direct load electronic balance system includes the steps of elastically associating the frame and the support system of the balance, and adjusting tension between the frame and the support system to provide a selected offset to balance system capacity.

It is therefore an object of this invention to provide electronic weighing devices and methods providing high resolution performance and enhanced capacity range.

It is another object of this invention to provide offset electronic weighing devices characterized by low power consumption and resultant lowered system heat, offset midpoint adjustment without need for levers or counterweights, low inertia, accommodation of various balance models and capacities utilizing elements common to all, and compact design.

It is another object of this invention to improve performance and capacity range of direct load electronic balances.

It is still another object of this invention to provide an electronic weighing device including a frame, a load displaceable support system connected with the frame, an electro-magnetic load compensation system connected with the frame and the support system, the load compensation system compensating for displacement of the support system relative to the frame and responsive thereto providing output indicative thereof, and an elastic offset connected between the frame and the support system establishing a selected offset at the support system.

It is yet another object of this invention to provide a direct load electronic balance including a frame having a permanent magnet and a fixed portion of a null sensor attached thereto, upper and lower support members articulatably connected with the frame, an armature structure connected with the upper and lower support members and including a pan mount, a movable portion of the null sensor, and a coil located adjacent to the permanent magnet, a servo system connected with the null sensor and the coil for selective adjustment of current to the coil responsive to signals from the null sensor, and at least a first tension adjustable spring connected between the armature structure and the frame.

It is still another object of this invention to provide a method for adapting a direct load electronic balance having a frame supporting a permanent magnet, a load displaceable support system carrying a coil articulatably connected with the frame, the adapting method to provide counterbalancing of up to about one-half of the balance's rated capacity to thereby reduce balance system heating, the method including the steps of connecting at least one elastic member between the frame and the support system, and adjusting tension of the elastic member to provide selected counterbalancing.

It is still another object of this invention to provide a method for enhancing weight measurement accuracy by a direct load electronic balance system having a frame with a load displaceable support system articulatably connected therewith, the method including the steps of elastically associating the frame and the support system, and adjusting tension between the frame and the support system to provide a selected offset to balance system capacity.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

The now preferred embodiment of the weighing device of this invention is illustrated in FIGS. 1 through 4. Balance 10 includes rigid frame 12 which carries a load displaceable support system 13. Support system 13 includes upper load support member 15 and lower load support member 17, each attached to frame 12 (using, for example, screws 18—see FIG. 4) in an articulatable manner at two points through flexures 21. Bracket 25 is interposed between frame 12 and upper support member 15 to facilitate adjustment of off-center loading as describe below. Upper and lower support members 15 and 17 carry armature structure 28 of support system 13 at flexures 30.

Figure 4:
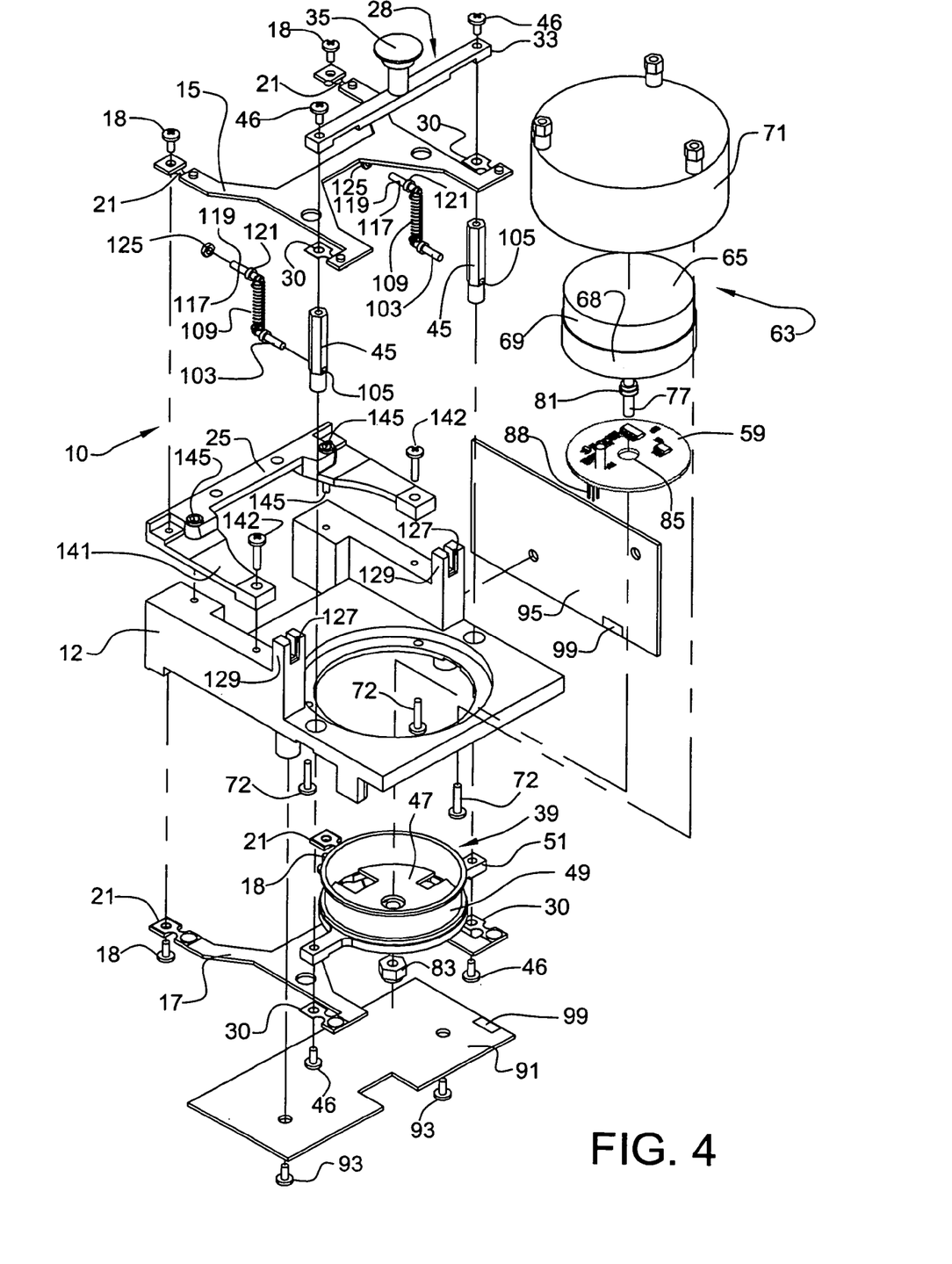
FIG. 4 is an exploded view of the balance of FIG. 1.

Armature structure 28 includes upper assembly bar 33 having pan mount 35 centrally affixed thereat (no particular type of pan is shown herein, structures for such pans being varied and well known to those skilled in the art), movable plate and coil assembly 39, and vertical spacer tubes 45 connected between bar 33 and lower support member 17 using connectors 46 (screws, for example—see FIG. 4). Assembly 39 includes movable plate 47 (the movable portion of a null sensor) and coil 49 both mounted on mounting plate 51 connected at the lower pair of flexures 30. Fixed plate 59 (the fixed portion of a null sensor) is mounted at frame 12 (as discussed herein below) adjacent to movable plate 47 to form a capacitance null sensor (it should be realized that the invention could as well be embodied for use with optical or other types of null sensors having a movable and fixed portion).

Figure 1:
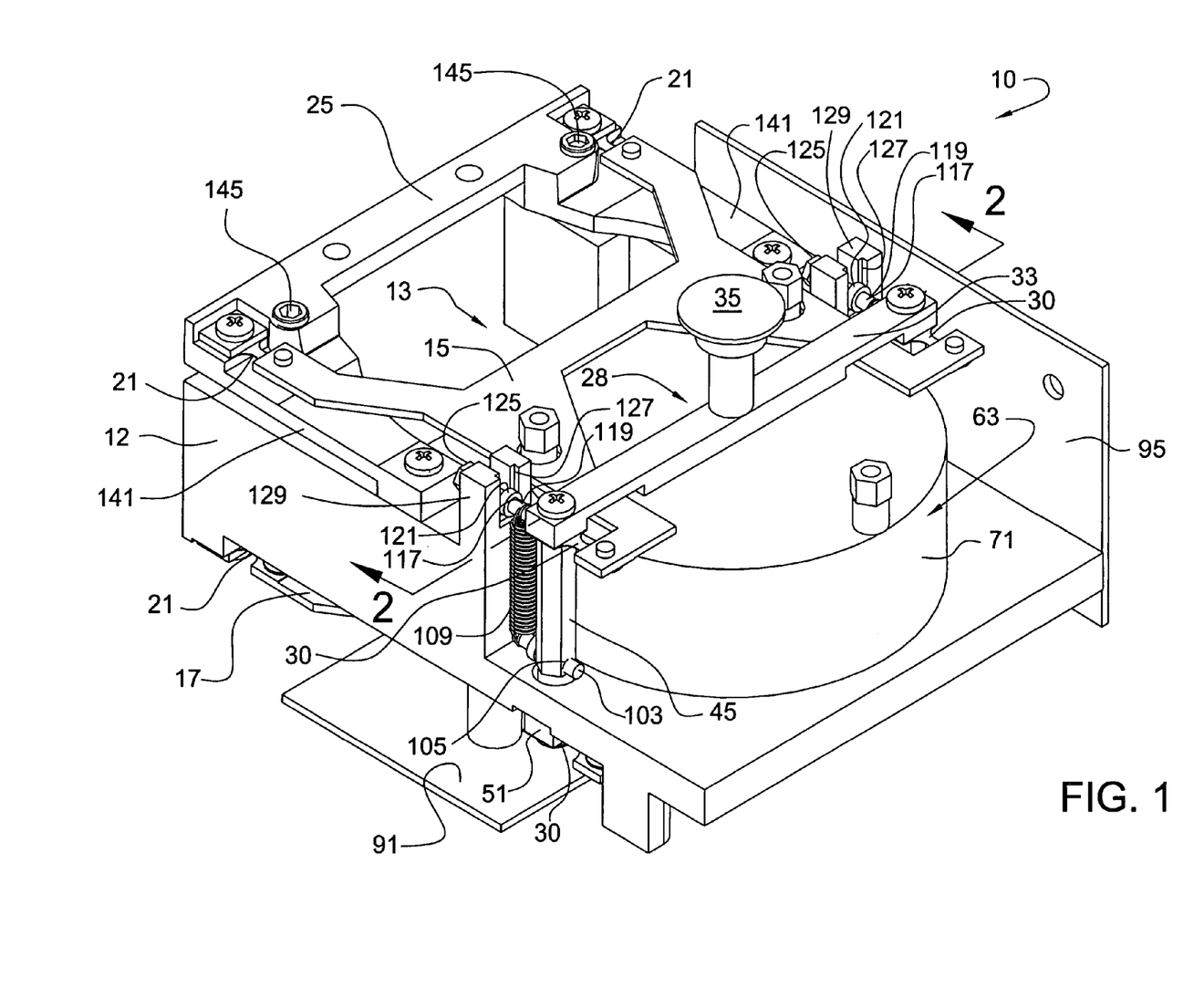
FIG. 1 is a perspective view of a first, and now preferred, embodiment of the offset weighing device (a balance) of this invention.
Figure 2:
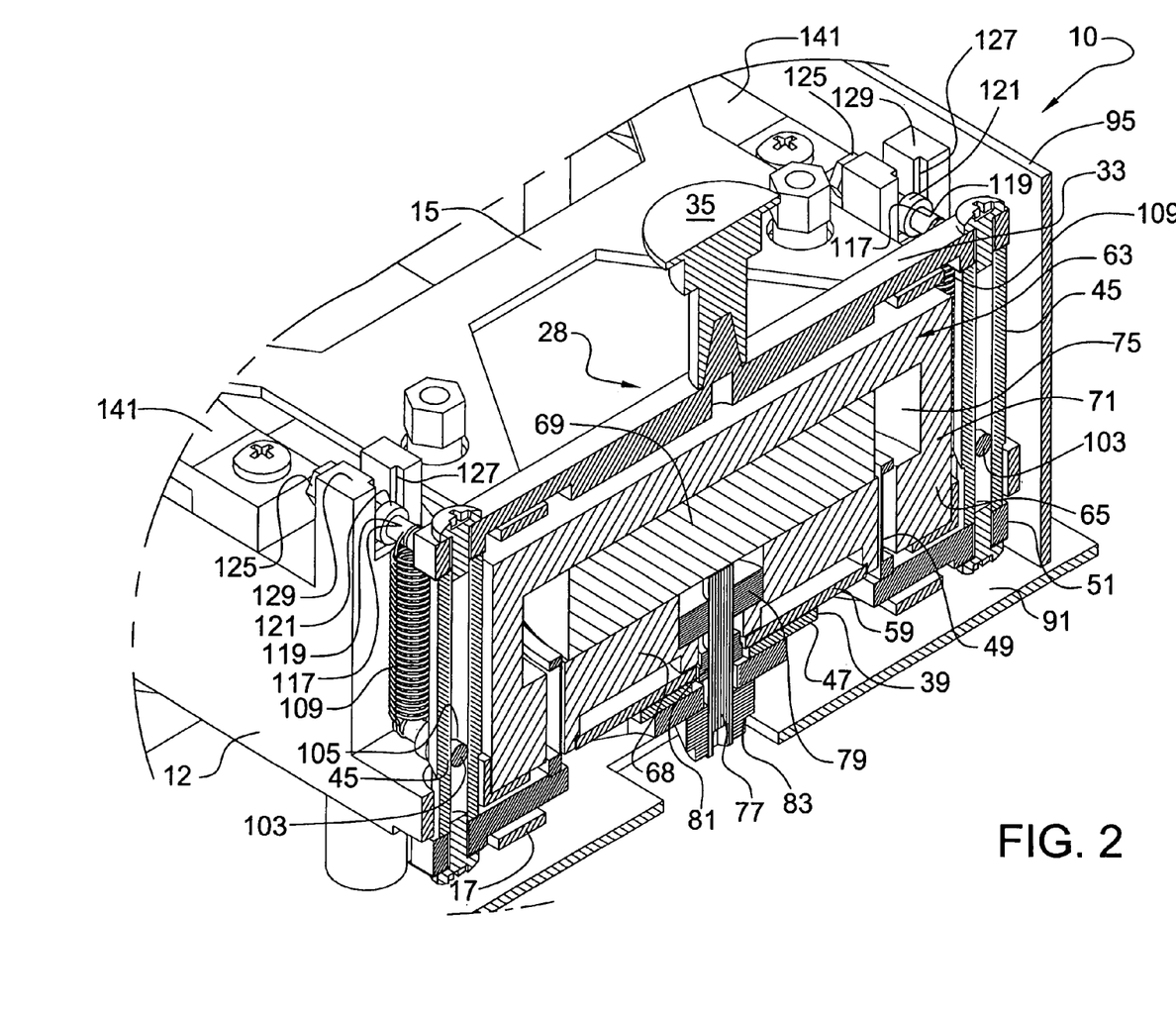
FIG. 2 is a partial sectional view taken through section lines 2-2 of FIG. 1.

Magnet assembly 63 includes permanent magnet 65 with inner pole 68 attached (glued, for example, utilizing intermediary material layer 69) to outer pole 71 which is attached to frame 12 using connectors 72 (screws, for example—see FIG. 4). Magnet 65 thus formed defines annular opening 75 receiving coil 49 thereat (see FIG. 2). As shown in FIGS. 2 and 4, mounting shaft 77 (a threaded shaft) utilizes pem nut 79 at one end to orient inner pole 71 of magnet 65, and collar 81 and nut 83 to define limits on the range of allowed motion for coil 49 and movable plate 47 in assembly 39 (the range of coaxial travel relative to shaft 77). Fixed plate 59 is received (at center hole 85) on shaft 77 and collar 81, and is secured against the bottom of inner pole 68 of magnet 65. Leads 88 from fixed plate 59 extend to analog electronics board 91 connected to frame 12 using connectors 93 (screws, for example—see FIG. 4). Digital electronics board 95 is connected to frame 12 and electronically to board 91 at multi-pin connector pair 99. Boards 91 and 95 mount the electronics utilized for operation, diagnostics, adjustment and readout with the weighing devices of this invention.

Figure 3:
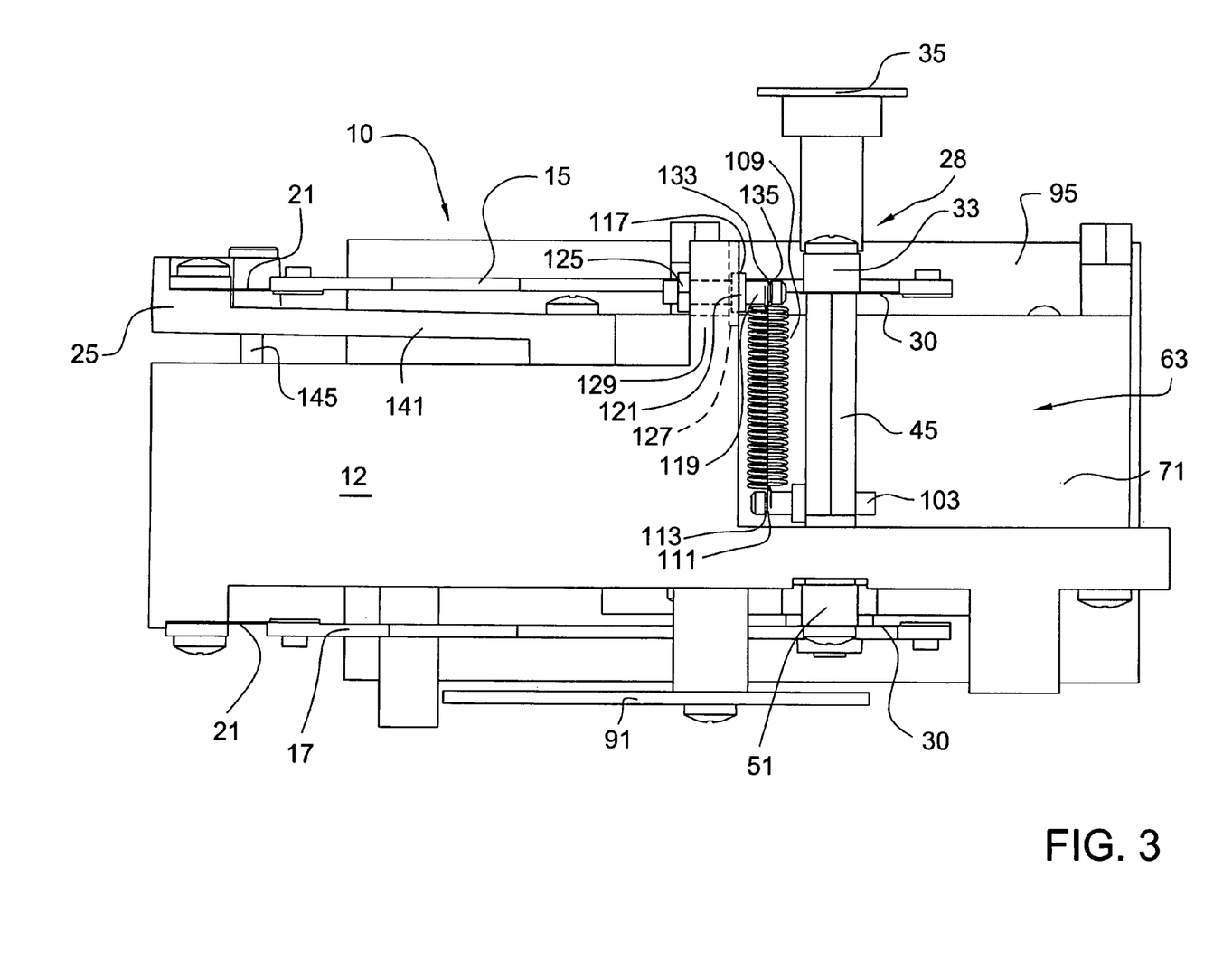
FIG. 3 is a side view of the balance of FIG. 1.

Each of vertical tubes 45 carries a pin 103 through opening 105 at one end thereof, and at which one end of springs or other elastic offset 109 are secured (for example at a hooked end 111 of springs 109 maintained in groove 113 of pin 103, as shown in FIG. 3). Elastic offset adjusters 117 include pins 119 and guide collars 121, adjusters 117 releasably securable by nuts 125 with guide collars 121 selectively located in channels 127 defined in uprights 129 of frame 12. Pins 119 of adjusters 117 receive the other end of springs 109 thereat (utilizing, for example, hook ends 133 received in grooves 135—see FIG. 3). The selected balancing offset (or preload) is achieved by selectively distending springs 109. Slidable guide collars 121 of adjusters 117 are positioned at channels 127 at a position affording the selected spring distention corresponding to the proper preload, and securing nuts 125 are tightened to preserve the selected preload.

Any type of elastic material or device for providing the desired tensioning offset (preload) may be utilized for offset 109 depending upon the desired stability and accuracy desired from balance 10. At present springs are preferred for most applications wherein a relatively high degree of stability is desired. In high performance applications, springs having a relatively low thermal expansion coefficient ($5 \times 10^{-6}$ in/in/F or below, at room temperature, preferably) and a relatively stable modulus of elasticity with temperature change are preferred. Spring materials such as music wire, BeCu, 303 stainless, INCONEL 600, Stainless W, titanium, NISPAN, niobium, rhenium, chrome silicon, tungsten and INVAR could be utilized, with high performance applications preferably utilizing materials such as NISPAN, niobium, rhenium, chrome silicon, tungsten, INVAR or like materials having low thermal expansion coefficients.

Offset 109 is utilized to at least counterbalance the movable mechanism of the balance supporting the load receiving pan, the offset preferably positioned to act substantially coaxially with the load bearing armature 28 (i.e., oriented substantially coaxially to the direction of load induced displacement of the armature structure). While dual lateral offsets 109 are shown herein in FIGS. 1 through 4, it should be appreciated that balance 10 could be provided with only one or the other of the offsets (i.e., asymmetrical offset), particularly for low capacity balances.

Bracket 25 directly carries upper support member 15 through flexures 21 on cantilevered legs 141 connected at their ends to frame 12 using connectors 142 (screws, for example—see FIG. 4). Legs 141 are independently adjustable by set screws 145 bearing against frame 12 to independently adjust the height of each flexure 21 thus allowing off-center loading to be accommodated (for high performance applications, compound set screws providing even finer height adjustability are preferred).

Figure 5:
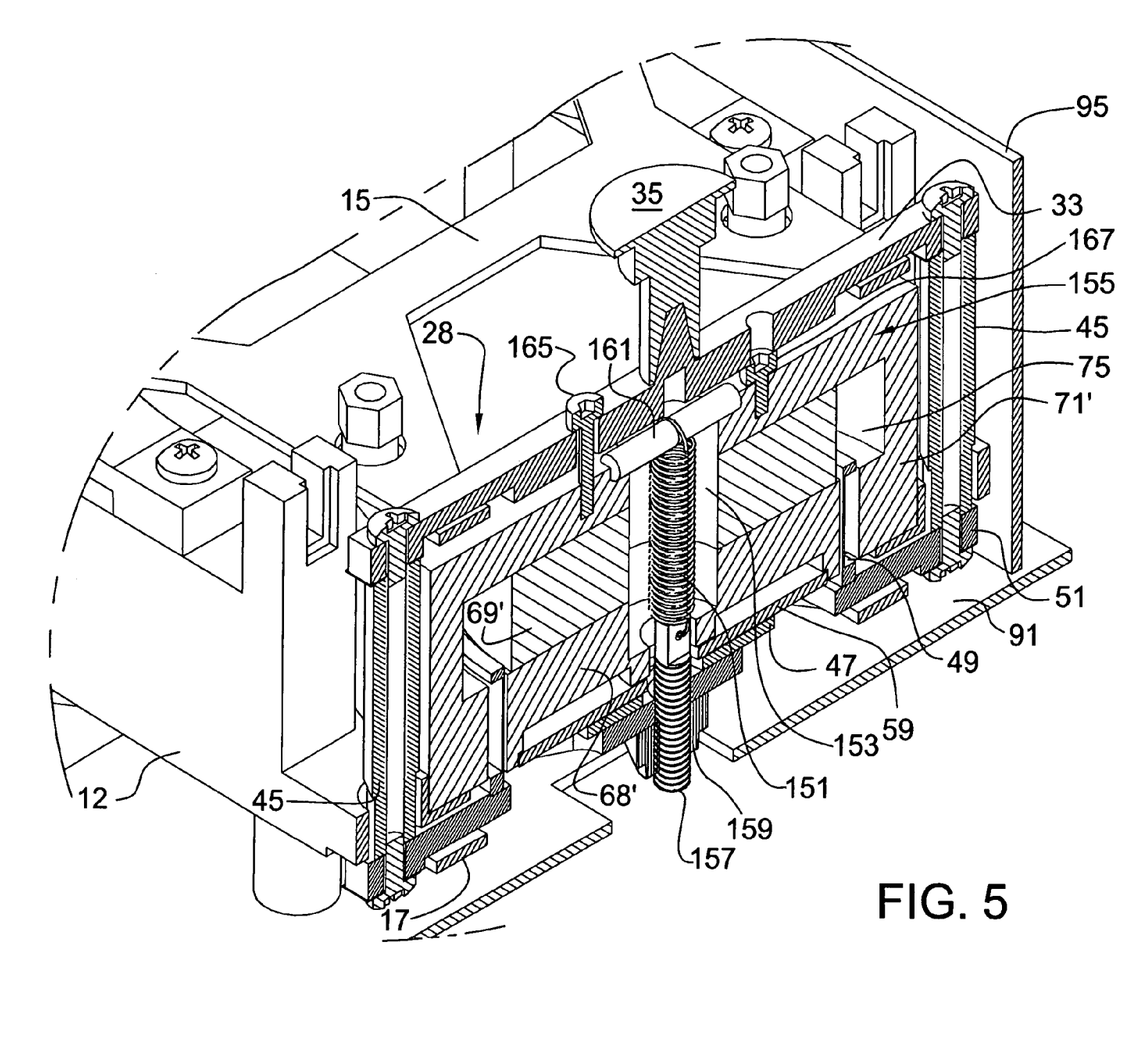
FIG. 5 is a partial sectional view of a second embodiment of the offset weighing device of this invention.

FIG. 5 illustrates an alternative embodiment of the balance of this invention in which a single elastic offset (spring) 151 is utilized (except as addressed herein, all other components remain unchanged and are identified accordingly). Spring 151 is coaxially located through opening 153 defined through magnet assembly 155 (including permanent magnet 65' having inner pole 68' connected with outer pole 71' utilizing intermediary layer 69', functionally equivalent in all respects to permanent magnet 65 heretofore described). Spring 151 is attached at one end to axially selectively locatable mount 157 adjustable by nut 159, and at the other end to pin 161 fixedly located adjacent to outer pole 71'. Range of travel of coil 49/movable plate 47 in this embodiment is defined and limited by set screws 165 and 167 adjustably maintained in outer pole 71' (set screws 165 and 167 limiting the extent of travel of bar 33 of armature structure 28).

Figure 6:
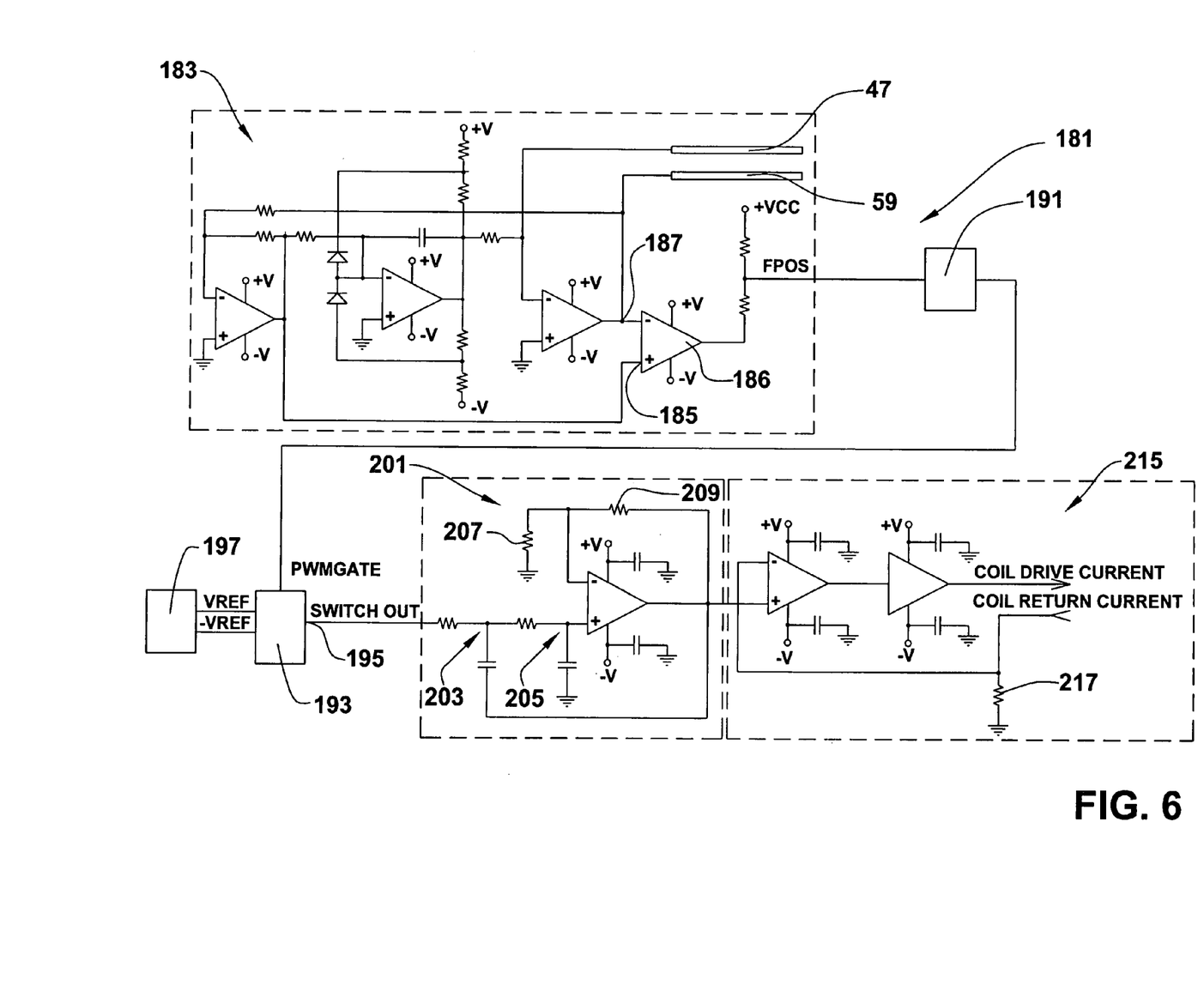
FIG. 6 is a schematic diagram illustrating the push-pull servo system utilized in the weighing devices of this invention.

A push-pull servo system 181 is shown in FIG. 6 utilized for null position detection by the offset electronic weighing devices of this invention. Position detector/oscillator circuit 183 is a state variable filter configured as a quadrature oscillator, generating a sine waveform at node 185 of comparator 186 and a cosine waveform at node 187. Comparator 186 converts the two signals at nodes 185 and 187 into an equivalent frequency with a square waveform suitable for further digital processing. This circuit is physically located in close proximity (on fixed plate 59, for example) to the fixed and moving plates 59 and 47 respectively, as well as coil 49 and magnet assembly 63 to assure close thermal tracking. This physical arrangement minimizes the unwanted effects of stray capacitance of the frequency generated.

Microprocessor controller 191 measures the period of four successive periods of the frequency output from position detector/oscillator circuit 183, at a fixed sampling rate (this defines a servo control cycle). This numeric value is arithmetically modified by the PID control algorithm to produce a value suitable for use as the next pulse width modulated servo control cycle. Microprocessor controller 191 generates the pulse width modulated waveform which is passed on to analog switch 193.

Switch 193 converts the unipolar pulse width modulated waveform into a bipolar waveform at is output node 195. The bipolar nature of the waveform allows the servo drive current to also be bipolar, enabling the push-pull ability of the coil 49/magnet assembly 63. Bipolar reference unit 197 generates two equal and opposite polarity DC voltages (vref and −vref). The resultant output from switch 193 is thus a pulse width modulated square waveform switching between the equal and opposite polarity DC voltage references.

Low pass filter circuit 201 is tuned by resistor/capacitor pairs 203 and 205 to filter the square wave nature of the analog switch output, converting the output to a variable, bipolar DC voltage proportional to the duty cycle of the pulse width modulated switch output at node 195. At a 50% duty cycle, the DC voltage output from low pass filter circuit 201 will be zero volts. At a 90% duty cycle, the DC voltage output from filter circuit 201 will be slightly less than the positive DC voltage reference. At a 10% duty cycle, the DC voltage output from filter circuit 201 will be slightly more than the negative DC voltage reference. Resistors 207 and 209 tune the span of the DC voltage which allows use of servo system 181 in many different balance system configurations having different capacities.

Low pass filter circuit 201 does not provide sufficient current generating ability to drive coil 49. Power buffer circuit 215 increases the current to appropriate levels for operation of coil 49. Resistor 217 provides a feedback voltage, based on the current through coil 49, to stabilize power buffer output.

Figure 7:
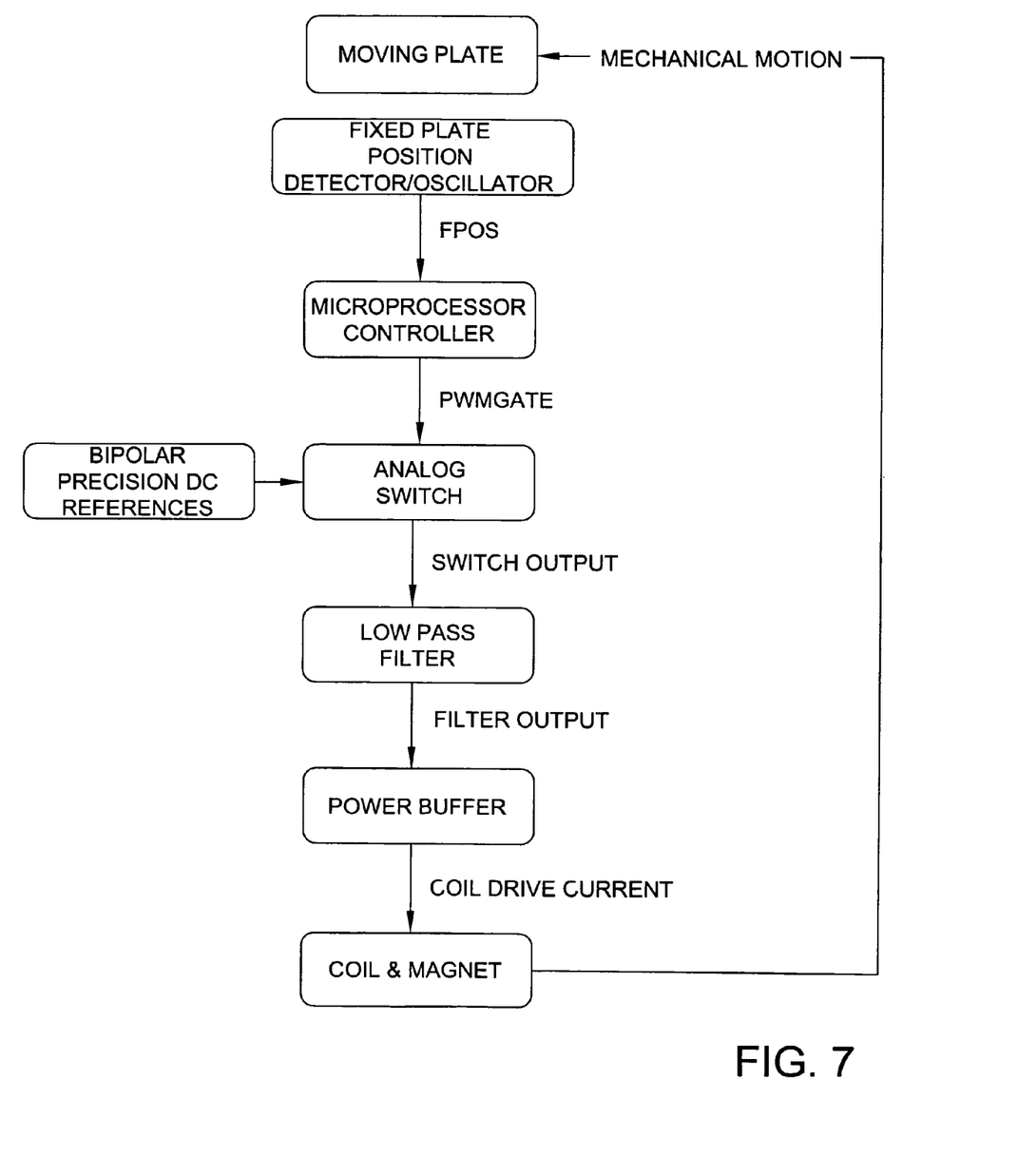
FIG. 7 is a flow diagram illustrating operation of the servo system of FIG. 6.

FIG. 7 is a block diagram illustrating operation of the electronics of the null position sensor (an included function of system 181). Mechanical motion, caused by increasing or decreasing the weight applied at the pan, changes the spacing between moving plate 47 and fixed plate 59 (the capacitor plates). In turn, the change of capacitor plate spacing causes a change of position oscillator circuit 183 frequency (FPOS). Microprocessor controller 191 measures the change of frequency at a fixed sampling rate and calculates a new pulse width modulation value (PWM-GATE) such that the coil drive current from power buffer circuit 215 will tend to restore the relative position of the capacitor plates to the null position. The change in PWM-GATE is proportional to the change in weight of a load at the pan. Bipolar, precision DC voltage references from unit 197, in combination with low resistance analog switch 193, convert the unipolar pulse width modulated signal into a bipolar pulse width modulated signal. Low pass filter circuit 201 converts the bipolar pulse width modulated signal into a bipolar DC voltage level which is current boosted by power buffer circuit 215. This boosted current is directed to coil 49 which is immersed in the magnetic field of the permanent magnet 65. This bipolar current in coil 49 and magnet 65 causes a mechanical motion to drive the mechanical system (support system 13) back to the null point from either above or below the null point and depending on the measured change of position (thus accommodating both preloads and loads from springs 109/151 and items placed in the pan for weighing, respectively).

While a push-pull servo system is preferred as described herein, a push servo system could be utilized in the balance of this invention. In such case, offsets 109/151 would be calibrated to compensate only for system mass (i.e., the effective mass of the pan assembly only, including armature 28 and support members 15/17).

As may be appreciated from the foregoing, in either of the embodiments shown in the FIGURES utilizing a push-pull servo system, counterbalancing of armature structure 28 on upper and lower support member 15 and 17 by springs 109/151 to about one-half of the balance's rated capacity in any particular embodiment initially causes current in the null sensor coil 49 to flow in a direction producing a resultant force which is additive to the pan load. Only when the counterbalancing force is exceeded by the pan load does the coil current produce a force opposing the pan load. In such case the power requirement is reduced by about one-half and heat generated by coil 49 is about one quarter of that produced by a balance that fully counterbalances the pan load. Moreover, the adjustability of springs 109/151 allow preload adjustment for different load ratings used in different balance embodiments.

What is claimed is:

1. A high resolution enhanced capacity direct load electronic weighing device comprising:
   a frame;
   a load displaceable support system movably maintained within said frame and including a load receiving pan mount;
   an electro-magnetic load compensation system in a push-pull servo arrangement connected with said frame and said support system, said load compensation system compensating for displacement of said support system relative to said frame and responsive thereto providing output indicative thereof; and
   an elastic offset connected between said frame and said support system establishing a selected offset at said support system equivalent to weight of said support system plus up to about one-half of load capacity receivable at said pan mount of said support system, said elastic offset having a substantially constant distension maintained during use by operation of said load compensation system and said push-pull servo arrangement.

2. The device of claim 1 wherein said elastic offset is oriented substantially coaxially to the direction of load induced displacement of said support system.

3. The device of claim 1 wherein said elastic offset is at least a first spring.

4. The device of claim 1 wherein said electro-magnetic load compensation system provides a compensating equilibrium force opposing force of a load received at said support, a signal indicative thereof providing said output.

5. The device of claim 1 wherein said electro-magnetic load compensation system includes a push-pull servo for restoration of support system position relative to said frame from either above of below a selected null position.

6. The device of claim 1 wherein further comprising at least a first adjuster interposed between said frame and said elastic offset allowing user change of said selected offset.

7. A high resolution enhanced capacity direct load electronic balance comprising:
   a frame having a permanent magnet and a fixed portion of a null sensor attached thereto, a first vertical guide channel defined at said frame;
   upper and lower support members articulatably connected with said frame;
   an armature structure connected with said upper and lower support members and including a pan mount, a movable portion of said null sensor, and a coil located adjacent to said permanent magnet, said armature structure including a first vertical spacer connected between said upper and lower support members, said spacer having a securement thereat;
   a push-pull servo system connected with said null sensor and said coil for selective adjustment of current to said coil responsive to signals from said null sensor;
   at least a first tension adjustable spring connected between said securement of said first vertical spacer of said armature structure and said frame to provide selective counterbalancing at said armature structure equivalent to about weight of said armature structure plus a portion of load capacity receivable at said pan mount of said armature structure, said spring having a substantially constant selected spring distension maintained during use by operation of said push-pull servo system; and a first spring tension adjuster having said spring connected therewith and including a guide slidable in said channel at said frame and releasably securable thereat.

8. The balance of claim 7 further comprising a second tension adjustable spring connected between said armature structure and said frame.

9. The balance of claim 8 wherein said armature structure includes a second vertical spacer connected between said upper and lower support members, said second spacer having a securement thereat for connection of said second spring thereto, said device further comprising a second spring tension adjustor having said second spring connected therewith, said second spring tension adjuster including a guide slidable in a second channel defined at said frame and releasably securable thereat.

10. The balance of claim 7 further comprising a bracket having cantilevered legs connected with said frame at one end and each said leg having said upper support member articulatably connected at an opposite end thereof, said bracket including means for independent adjustment of height of each said leg at said connection with said upper support member.

11. The balance of claim 7 wherein said armature structure is articulatably connected with said upper and lower support members, and wherein said first spring is oriented substantially coaxially to the direction of load induced displacement of said armature structure.

12. The balance of claim 7 wherein said servo system is a push-pull servo system, whereby selected counterbalancing of load at said armature structure by said tension adjustable spring causes current from said push-pull servo system to flow in a direction in said coil producing a resultant force which is additive to said load at said armature structure until said selected counterbalancing is overcome by load applied at the armature structure.

13. A method for adapting a high resolution direct load electronic balance having a frame supporting a permanent magnet, a movable load displaceable support system carrying a coil articulatably connected with said frame, and a push-pull servo system connected with said coil and a null sensor, said adapting method to provide counterbalancing of up to about one-half of the balance's rated capacity to improve balance system performance, said method comprising the steps of:

connecting at least one elastic member between the frame and the support system;

selecting tension of said elastic member to provide counterbalancing at said support system equivalent to about weight of the movable support system plus a portion of load capacity receivable at said support system; and maintaining substantially constant selected elastic member distension during use by operation of said push-pull-servo system.

14. The method of claim 13 further comprising connecting a second elastic member between the frame and the support system and adjusting tension of said first and second elastic members.

15. The method of claim 13 further comprising orienting said elastic member substantially coaxially to the direction of load induced displacement of the support system.

16. A method for enhancing weight measurement accuracy by a high resolution direct load electronic balance system having a frame with a load displaceable support system articulatably connected therewith, said method comprising the steps of:

elastically associating the frame and the support system utilizing a spring;

adjusting tension between the frame and the support system to provide a selected offset to balance system capacity equivalent to weight of said support system and up to about onehalf of load capacity receivable at said support system by selectively locating one end of said spring relative to a guide channel at the frame; and maintaining substantially constant spring distension during use by operation of a push-pull servo system including a coil at the load displaceable support system and a sensor.

17. The method of claim 16 wherein the step of elastically associating the frame and the support system includes the step of connecting said spring between the frame and the support system.

18. The method of claim 17 further comprising the step of orienting said spring substantially coaxially to the direction of load induced displacement of the support system.

19. The method of claim 16 wherein the step of elastically associating the frame and the support system includes elastically associating the frame and support system at first and second locations.

* * * * *